United States Patent
Naciri et al.

(10) Patent No.: US 7,794,834 B2
(45) Date of Patent: Sep. 14, 2010

(54) NEMATIC ELASTOMER FIBER WITH MECHANICAL PROPERTIES OF A MUSCLE

(75) Inventors: Jawad Naciri, Herndon, VA (US); Hong Jeon, Carlsbad, CA (US); Patrick N Keller, Bures sur Yvette (FR); Banahalli R Ratna, Woodbridge, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 1097 days.

(21) Appl. No.: 11/425,409

(22) Filed: Jun. 21, 2006

(65) Prior Publication Data
US 2007/0010627 A1    Jan. 11, 2007

Related U.S. Application Data

(62) Division of application No. 10/923,154, filed on Aug. 18, 2004, now Pat. No. 7,122,598.

(51) Int. Cl.
| | |
|---|---|
| B32B 27/02 | (2006.01) |
| B32B 27/36 | (2006.01) |
| B32B 27/40 | (2006.01) |
| C08F 20/10 | (2006.01) |
| C08G 63/91 | (2006.01) |
| C08L 33/04 | (2006.01) |
| C08L 51/08 | (2006.01) |
| C08L 75/00 | (2006.01) |
| C09K 19/38 | (2006.01) |

(52) U.S. Cl. ......... 428/394; 428/1.1; 428/395; 525/63; 525/69; 525/81; 525/85; 525/330.3; 252/299.01

(58) Field of Classification Search ............ 428/1.1, 428/394, 395; 252/299.01; 525/63, 69, 81, 525/85, 330.3
See application file for complete search history.

(56) References Cited

U.S. PATENT DOCUMENTS

| | | | | |
|---|---|---|---|---|
| 5,385,690 A | * | 1/1995 | Finkelmann et al. | 252/299.01 |
| 7,122,598 B2 | * | 10/2006 | Naciri et al. | 525/63 |
| 2007/0215836 A1 | * | 9/2007 | Van Bruggen et al. | 252/299.01 |

FOREIGN PATENT DOCUMENTS

WO    WO 2005113867 A1 * 12/2005

* cited by examiner

*Primary Examiner*—Shean C Wu
(74) *Attorney, Agent, or Firm*—Amy L. Ressing; Joseph T. Grunkemeyer (57) ABSTRACT

A method of making a liquid crystalline fiber is disclosed. A copolymer having a liquid crystalline side group and a crosslinking side group is crosslinked. A fiber of the crosslinking copolymer is drawn before the crosslinking reaction is complete.

12 Claims, 7 Drawing Sheets

NEMATIC ELASTOMER FIBER WITH MECHANICAL PROPERTIES OF A MUSCLE

This application is a divisional application of U.S. patent application Ser. No. 10/923,154, allowed, and filed on Aug. 18, 2004. U.S. patent application Ser. No. 10/923,154 is incorporated herein by reference.

BACKGROUND OF THE INVENTION

1. Field of the Invention

The invention relates to a liquid crystalline fiber.

2. Description of the Prior Art

There has been considerable effort to develop human-made actuator materials that can mimic muscle performance. The developmental goal is to generate large mechanical actuation induced by external stimuli such as electric field, temperature, and light. Many materials and approaches have been developed towards this goal including hydrogels, dielectric elastomers, shape memory polymers, conducting polymers, carbon nanotubes, and ferroelectric liquid crystal elastomers. However, there are few that come close to meeting the properties of natural muscle. For instance, hydrogels show a very large volume change. The drawback is a low modulus and speed. On the other hand, electrostrictive materials have demonstrated a very fast response rate, but a high voltage is required.

Because of their anisotropic orientational symmetry in combination with rubber elasticity, liquid crystal (LC) elastomers are promising materials for applications in the field of sensors and actuators. The potential for liquid crystalline materials to exhibit unusual properties was first suggested by de Gennes, *Phys. Lett.*, 28A, 725 (1969). (All referenced publications and patents are incorporated herein by reference.) Subsequently, such elastomers have been prepared and their resultant properties investigated. In general, the elastomers most frequently studied have been those based on side-chain liquid crystalline polymers rather than the main-chain systems considered originally by de Gennes. These elastomers exhibit anisotropic shape change under applied fields as they go through phase transitions and retain network memory, which enables them to reversibly contract and extend.

There are two basic approaches to prepare LC elastomers: the first approach developed by Mitchell and co-workers (Lacey et al., *J. Mater. Chem.*, 8, 53 (1998)) involves crosslinking an acrylate polymer prealigned in a magnetic field. Such samples are found to show complete recovery from their global orientation on cooling to the nematic phase from the isotropic phase. The second method due to Finkelmann and co-workers (Kundler et al., *Macromol. Chem. Phys.*, 199, 677 (1998)) involves a two-step cross-linking strategy of a siloxane liquid crystal polymer. The first stage involves a lightly cross-linking of the polymer while applying a stress field. Subsequently, a second cross-linking reaction is performed which fixes the uniaxial alignment. By this method LC elastomers of large dimensions with permanent alignment and highly anisotropic mechanical properties were produced. An alternative approach to the use of chemical reactions to produce intermolecular cross-linking is photo-crosslinking. Although such materials show promise for the generation of elastomers, there may be a number of problems associated with their use.

Thomson et al., (*Macromolecules*, 34, 5868 (2001)) presented detailed studies of mechanical properties of two LC elastomer films. These networked films exhibited muscle-like physical properties with strains of 35-40% and blocked stress values of the order of 200 kN/m$^2$.

SUMMARY OF THE INVENTION

The invention comprises a fiber having a polymeric backbone with a liquid crystalline side group and a crosslinking side group, both bonded to the backbone, and crosslinks between the crosslinking side groups.

The invention further comprises a method making a fiber comprising the steps of: providing a copolymer having a liquid crystalline side group and a crosslinking side group; commencing a crosslinking reaction with the copolymer; and drawing a fiber of the crosslinking copolymer before the crosslinking reaction is complete.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Any reference to an ingredient can refer to one embodiment of such ingredient or a combination of one or more embodiments. All polymeric structures claimed include all configurations, isomers, and tacticities of the polymers within the scope of the claims.

A method is described for preparing LC fibers from a side chain liquid crystalline terpolymer containing two side-chain mesogens and a nonmesogenic group that acts as a reactive site for cross-linking. The initial cross-linking is allowed to occur in the gel phase, and the sample is mechanically stretched to obtain a monodomain sample before the cross-linking is complete. Thermoelastic and isostrain studies performed as a function of temperature across the nematic-isotropic phase transition of the fiber drawn from a mixture of the terpolymer with the cross-linker show that the fiber can mimic some of the mechanical properties of a natural muscle.

Uniaxial contraction of the material can be achieved in the fiber through the nematic to isotropic phase transition. By varying the chemical composition of the elastomer, crosslinking temperature, and crosslinking method, the operating temperature, strain, and force generation can be tuned. Isostrain studies on these nonlinear elastomers show that the restoring force far greater than skeletal muscles can be developed in these actuators.

A variety of copolymers may be used to make the fiber. As used herein, the term "copolymer" includes copolymers, terpolymer, and polymers having any number of copolymerized monomers, including block, alternating, and random copolymers. The backbone of the copolymer may be, but is not limited to, polyacrylic, polysiloxane, or polynorbornene. The liquid crystalline side groups on the copolymer may be, but are not limited to, nematic or smectic, and may be laterally affixed to the backbone. The copolymer also has side groups that may be crosslinked. Eq. (1) shows a possible structure for the copolymer. The side group shown as an oval is the liquid crystalline side group and the L is the crosslinking side group. It is not necessary that every repeat unit of the copolymer contain a side chain.

(1)

The copolymer may be an acrylic polymer. This may be made by copolymerizing acrylic monomers that contain the side groups as in Eq. (2). Other acrylic monomers and vinyl monomers, including, but not limited to, acrylic acid may also be included. Other polymerizable monomers that contain the side groups can also be made.

(2)

Alternatively, the side groups can be added to an existing polymer. Eq. (3) shows an example of this using polysiloxane. The polymer contains hydrogen for reacting with compounds containing both the side groups and a vinyl group in a hydrosilation reaction. The polymer also contains methyl groups to block the reaction at other sites.

(3)

-continued

Any liquid crystalline side groups may be used. A general class of liquid crystalline side groups is shown in Eq. (4). The dashed lines indicate that the ester group can be bonded to any one of the $A^1$'s or $A^2$. However, the ester group is not bound to a cyclohexyl group. The T's represent terminal groups of the liquid crystalline side group. No more than one of them can be an alkenyl or cyano. $T^1$ is selected from the group consisting of alkyl, n-butyl, n-pentyl, polysiloxyl, and alkylpolysiloxyl; and $T^2$ is selected from the group consisting of alkyl, n-butyl, n-pentyl, alkenyl, polysiloxyl, alkylpolysiloxyl, and cyano. The A's are generally phenyl or cyclohexyl groups, with the possibility of an oxygen between an $A^1$ and a T. Each $A^1$ is independently selected from the group consisting of phenyl, oxyphenyl, substituted phenyl, substituted oxyphenyl, and cyclohexyl; and $A^2$ is selected from the group consisting of phenyl and substituted phenyl. An $A^1$ group may also be a fluorophenyl. The X groups are spacers between the A groups. Each X is independently selected from ester group, azo, azoxy, and covalent bond. The R group is the portion that is bonded to the backbone and is —$CH_2$—$CH_2$—* or —*, where * represents the backbone. Specifically, R is ethylene when the backbone is polysiloxane and is a covalent bond when the backbone is polyacrylic. R may be just a covalent bond because, as used herein, the ester group shown in Eq. (2) is considered to be part of the polyacrylic backbone. The value of n is a nonnegative integer, including, but not limited to, 4-12. If n is too large, there may not be sufficient coupling between the liquid crystalline side group and the backbone.

(4)

The coupling between the liquid crystalline side group and the polymer backbone is important for the thermostrictive behavior of elastomeric materials. Theoretical and experimental studies have shown that orientational order of the side groups will be accompanied by some level of orientational order in the polymer backbone. The use of laterally affixed liquid crystal mesogens can produce large backbone anisotropy. This is as opposed to liquid crystalline side groups that are attached to the backbone at the end of the side group.

Several example side groups are shown in Eq. (5) through (13). Where shown, each m and p is an independently selected positive integer, including, but are not limited to, 4 and 5 for p and 4 for m. Suitable ranges include, but are not limited to, 4-12 for p and 1-4 for m. If p or m is too large, the side group may not have liquid crystalline properties. Where shown, a Y group can be H or F.

(5)

(6)

(7)

(8)

(9)

(10)

(11)

(12)

(13)

The crosslinking side group may be, but is not limited to, an alkyl alcohol group, such as butanol. When the backbone is polyacrylate, this may be incorporated by reacting with 4-olbutyl acrylate. When the backbone is a polysiloxane, this may be incorporated by reacting with 2-(but-3-eneyloxy)tetrahydropyran. Subsequent reaction with methanol and an ion-exchange resin such as Amberlyst 15 removes the tetrahydropyran and converts the side chain to an alcohol. This procedure is used because an unprotected hydroxyl group could also react with the polysiloxane backbone.

A copolymer may also include multiple liquid crystalline or crosslinking side groups. The full structure of an example copolymer using two liquid crystalline side groups is shown in Eq. (14)

(15)

(14)

The copolymer can be crosslinked and drawn into a fiber. This can be done by mixing a crosslinking agent with the copolymer. When the crosslinking side group has a hydroxyl group, then the crosslinking agent may have isocyanate groups, so that carbamide linkages are formed between the crosslinking side group and the crosslinking agent, or epoxy groups, so that alcohol ether linkages are formed. Acrylic crosslinking agents may also be used. Once the crosslinking reaction has occurred, the crosslinking side group may be an alkyl group such as 1,4-n-butyl. Suitable crosslinking agents include, but are not limited to, 4,4'-methylenebis(phenyl isocyanate), diisocyanoalkane, and 4,4'-diisocyanoto biphenyl.

Using appropriate reactants, the crosslinking may also be done by photopolymerization. An epoxy crosslinking monomer, such as acrylic acid oxiranylalkyl ester or acrylic acid (7-oxa-bicyclo [4.1.0]hept-3-yl)alkyl ester. The alkyl group may have an intervening short-chain poly(dimethylsiloxane). When the crosslinking monomer is acrylic acid 5-oxiranylpentyl ester (Eq. (15)), the crosslinking side group is 5-oxiranylpentyl. The oxirane groups can be photopolymerized without the presence of a crosslinking agent and shown in Eq. (16). The crosslinking side group 1,5-pentyl, and the crosslink is ethoxy.

-continued (16)

Figure 1:
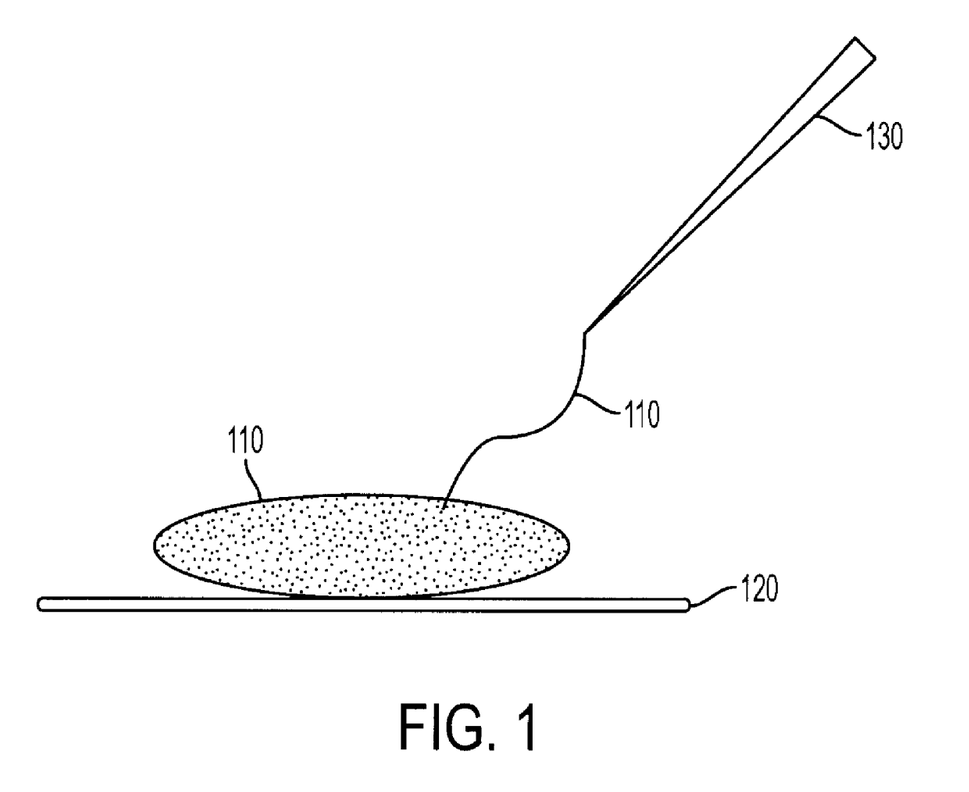
FIG. 1 schematically illustrates a method for drawing a fiber of the invention.

Fiber drawing may be performed by causing the crosslinking reaction to begin, such that the viscosity of the mixture increases to allow for drawing a fiber, and drawing the fiber before crosslinking has completed. Once crosslinking is complete, the fiber can maintain its shape. FIG. 1 schematically illustrates a drawing process that may be used. The copolymer/crosslinking agent mixture is warmed on a hot stage. Tweezers are used to draw a fiber from the mixture.

Figure 2:
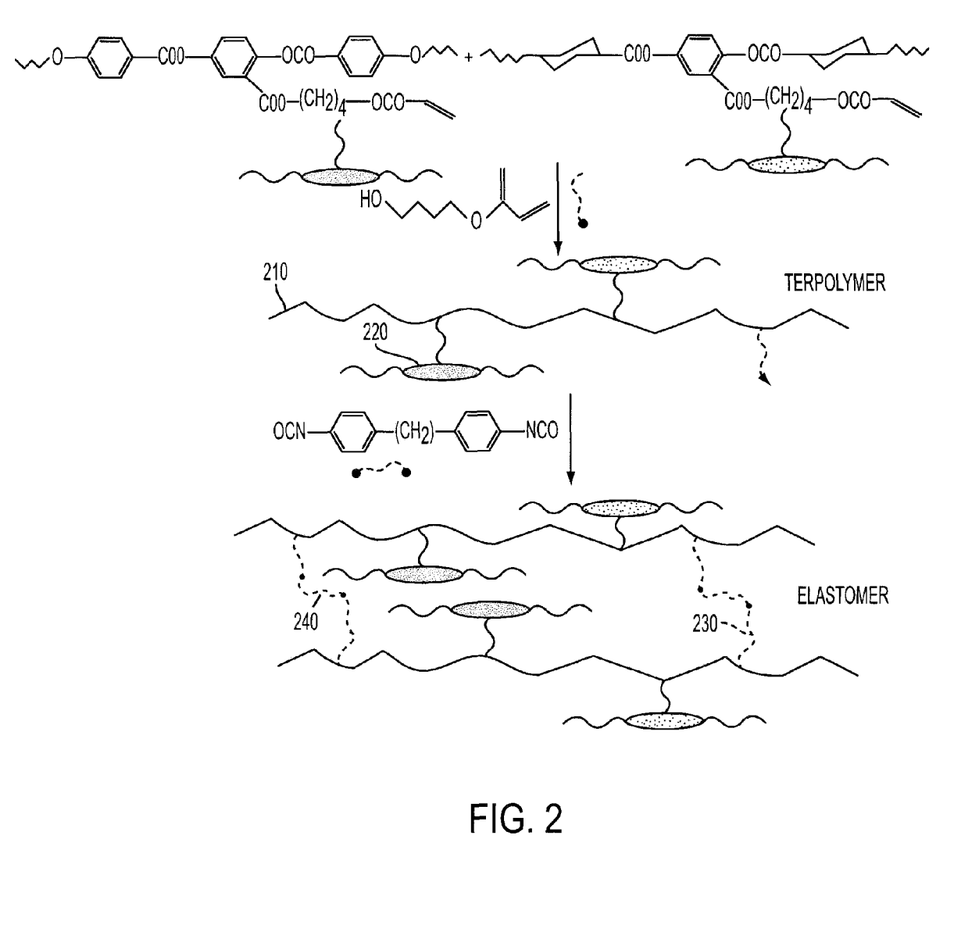
FIG. 2 schematically shows a synthesis scheme for the crosslinked polymer.

Eq. (17) shows a possible structure for a crosslinked polymer formed from the copolymer shown in Eq. (14). Not all side groups are shown in this structure. Each pair of carbon atoms in the backbone has a side group when copolymer of Eq. (14) is used. FIG. 2 schematically shows the synthesis scheme, with backbone 210, liquid crystalline side groups 220, crosslinking side groups 230, and crosslinks 240.

(17)

Figure 3:
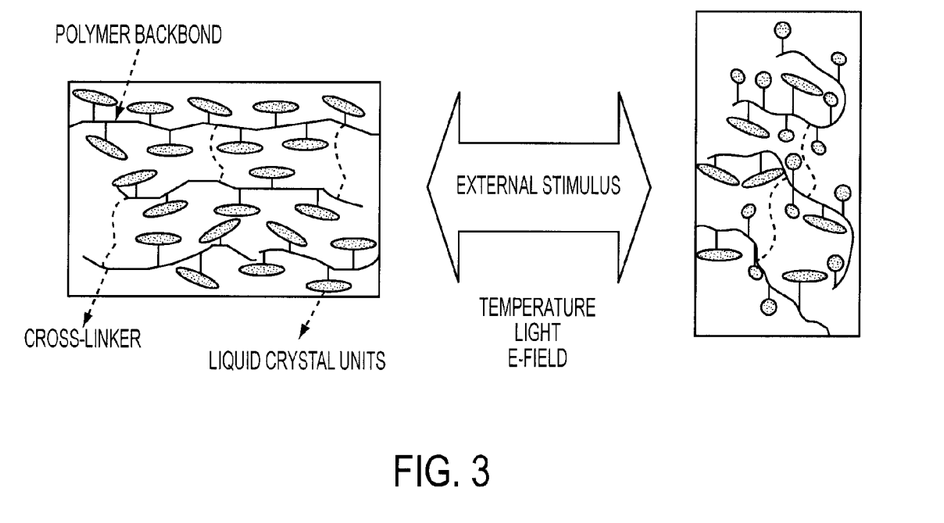
FIG. 3 schematically illustrates the nematic transition of the fiber material.

When the fiber is made, the liquid crystalline side groups may have orientational order. When a stimulus such as thermal, electrical, or photo is applied to the fiber, these side groups can become substantially reoriented or disordered. This can have the effect of changing the dimensions of the fiber, such as shortening the length of the fiber. This effect is schematically illustrated in FIG. 3. Electrical stimulation may be effective when the liquid crystalline side chain has a dielectric anisotropy. Photo stimulation may be effective when liquid crystalline side chain has a photoexcitable group such as azo group, which changes its conformation.

By bundling the fibers together, an artificial muscle may be made. The scheme of preparing artificial muscles in the form of fibers is based, in part, on its similarity to the way the natural muscles are organized in bundles of fibers. It is well known that the LC mesogens are spontaneously ordered during the spinning of the fiber. Therefore, in the elastomer with side-on attachment of the liquid crystal mesogen, one expects the orientational order of the mesogen as well as the polymer backbone to be along the fiber axis. Here, the contraction is expected to occur along the fiber axis similar to what occurs in natural muscle fibers. One can use bundles of fibers in devices, the number of fibers in each bundle dictating the force that needs to be generated. To be able to use a LC elastomer as an artificial muscle, important issues have to be addressed, namely, the temperature range over which the actuation will occur, the orientation of the side-chain mesogen within the network so that the strain occurs along the fiber axis, the force generated by the artificial muscle, the performance (energy loss and work generated), and the response time of the actuator.

The nematic elastomers can be drawn into well-oriented fibers which can exhibit muscle-like physical properties with an elongation Up to 35% and blocked stress of 450 kPa, numbers which are very similar to that exhibited by skeletal muscles. The viscoelastic losses in this elastomer can be very small, suggesting that the material acts like a spring. The elastomer can be doped with thermally conducting carbon nanotubes without necessarily affecting the mechanical properties.

Having described the invention, the following examples are given to illustrate specific applications of the invention. These specific examples are not intended to limit the scope of the invention described in this application.

EXAMPLE 1

Formation of copolymer as shown in Eq.(14)—4-Hydroxybutyl acrylate inhibited with hydroquinone, 4,4'-methylenebis(phenyl isocyanate) (MDI), and anhydrous toluene were obtained from Aldrich. Prior to polymerization, hydroquinone was removed from 4-hydroxybutyl acrylate using an inhibitor removal column (Column DHR-4 from Scientific Polymer Products, Inc.). The syntheses of the monomers (4"-acryloxybutyl) 2,5-di(4'-butyloxybenzoyloxy)benzoate (MAOC4) and (4"-acryloxyloxybutyl) 2,5-di(4'-pentylcyclohexylcarboxyloxy)benzoate (MACC5) were described at Thomson et al., (*Macromolecules*, 34, 5868 (2001)). Analytical TLC was conducted on Whatman precoated silica gel 60-F254 plates. $^1$H NMR spectra were recorded on a Bruker DRX-400 spectrometer. All spectra were run in $CDCl_3$ solution. Molecular weight was determined by GPC using a Shimadzu LC-10A liquid chromatograph equipped with Plgel 5 μm Mixed-D column. THF was used as the mobile phase and polystyrene as standard. GC/FID sample analysis was carried out on a HP 6890 instrument equipped with a 30 m DB-5 column, with an oven program of 50° C. (1 min) to 300° C. (10 min) at a rate of 8° C./min.

The terpolymer was synthesized by free-radical polymerization of two side chain monomers MAOC4 and MACC5 in a specific molar concentration, namely 40/60 mol % ratio, and a nonmesogenic comonomer with a terminal hydroxyl group that acted as reactive site for cross-linking. The choice of this specific ratio was made on the basis of the studies of the phase diagram of the two monomer mixtures.

A mixture of MAOC4 (0.25 g, 0.4 mmol), MACC5 (0.38 g, 0.6 mmol), 4-hydroxybutyl acrylate (0.014 g, 0.10 mmol, 10%), and $1.56 \times 10^{-3}$ g (0.0094 mmol, 1%) of azobis(isobutyronitrile) (AIBN) was dissolved in 8 mL of toluene. The mixture was purged with nitrogen for 30 min to remove oxygen from the solution. The flask was immersed in an oil bath preset at temperature of 65° C. After heating overnight, the solution was poured in methanol. The polymer was purified by successive reprecipitation from THF solutions into methanol until TLC analysis shows no traces of unreacted monomers. The polymer was dried in a vacuum oven for 24 hr to yield 0.5 g of white waxy material. $^1$H NMR ($CDCl_3$): 0.8-2.6 (m, 77H aliph), 3.42-4.1 (m, 16H, $8CH_2$—O), 6.84-8.0 (m, 14H, ArH). The signal from olefinic hydrogens, which indicates the presence of the acrylic group, had completely disappeared from the NMR spectrum. The molecular mass determined from GPC (THF, polystyrene standard) was found to be $M_w$=30,000 mol/g and $M_n$=19,200 mol/g. The density of the hydroxybutyl group present in the polymer was indirectly determined by using the GC technique. A small amount of the mixture before and after polymerization was taken and injected into a GC instrument. The mixture consisted of MAOC4, MACC5, hydroxybutyl acrylate, toluene, and cyclohexanone (reference standard). Comparison of the area under the peaks for cyclohexanone and hydroxybutyl acrylate compounds before and after polymerization showed that all the crosslinker had been consumed.

EXAMPLE 2

Preparation of liquid crystal elastomer (LCE) fibers—Fibers were drawn from a melt mixture of the copolymer from Example 1 and MDI cross-linker. In a typical experiment, a small amount of the polymer (0.04 g) was heated to 80° C. on a microscope slide placed on a thermal stage (FIG. 1). A known amount of MDI (0.25/L mole ratio of MDI relative to the hydroxyl unit present in the polymer backbone) was added at this temperature. Using a concentration higher than 0.25 mol of MDI led to a brittle and inhomogeneous fiber. The temperature was then dropped to around 60° C., and the sample was mixed well at this temperature (about a minute) until the mixture appeared homogeneous. At this point, the mixture became viscous, indicating that the crosslinking had started to occur. The fibers were drawn by dipping the tip of a metallic tweezer and pulling the mixture with it as quickly as possible as shown schematically in FIG. 1. The fibers were left at room temperature for about 120 hr, over which the cross-linking reaction was completed. The average diameter of the fiber drawn this way was about 300 μm.

EXAMPLE 3

Thermoelastic and Isostrain Measurements—A Perkin-Elmer differential scanning calorimeter DSC 7 equipped with a CCA 7 liquid nitrogen cooling accessory was used to study the nematic-isotropic phase transition of the monomers and their corresponding polymers. Scans were done at 2° C./min heating and cooling rate over a temperature range of 0-110°

C. The melting temperature of indium was used as a standard for temperature calibration, which agreed to within 1° C. of the expected value.

All mechanical measurements were done on a TA Instrument DMA 2980 with tension clamp for thermoelastic and stress/strain measurements. The clamp assembly consists of a fixed upper clamp and a mobile lower clamp activated by an air bearing under pressure. The fiber was positioned between the two clamps and held under a preload of 0.001 N. The force was increased at the rate of 0.001 N/min, and the corresponding stress-strain values were measured. Thermoelastic experiments followed the length change as a function of temperature. The % strain vs. temperature data were collected while the temperature was ramped up (heating cycle) and down (cooling cycle). Isostrain experiments involved heating the fiber while holding it under a predetermined strain. The stress values were measured while the fiber was taken through the nematic-isotropic transition at a constant of 0.5° C./min.

Figure 8:
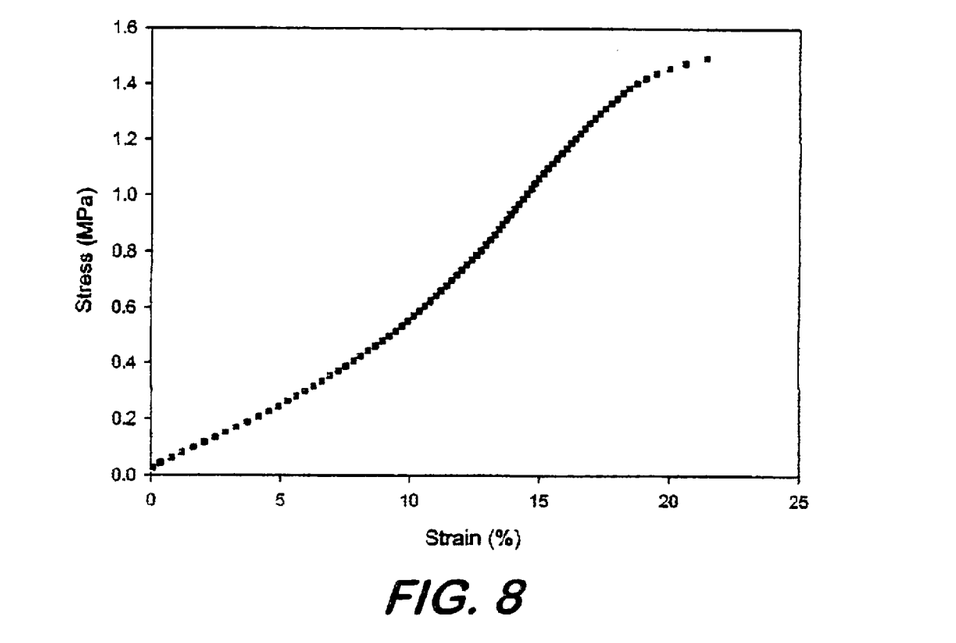
FIG. 8 shows a stress vs. strain plot of the fiber.

A stress vs. strain plot of a fiber left at room temperature for 120 hr and measured along the optic axis of the fiber is shown in FIG. 8. The measurement was done at 50° C. at force ramp rate of 0.005 N/min, with a 3.2 kPa preload stress. Initially, the slope of the stress-strain curve was approximately linear. The stress reached a maximum value at which it remained constant before it reached the breaking point of about 1.5 MPa. The time required for the fiber to be cross-linked completely was found to be approximately 120 hr. This result is based on the fact that beyond this time the Young's modulus ($E_m$) did not change. $E_m$ was determined in the nematic phase from the initial slope at small stress values and was found to be 4.37 MPa. The cross-linking density n of the fiber was estimated at low strain values using the equation $E=3nRT$, where E is Young's modulus measured in the isotropic phase, R is the gas constant, and T is temperature. The calculated cross-linking density was found to be $0.9 \times 10^{-4}$ mol/cm$^3$.

Figure 5:
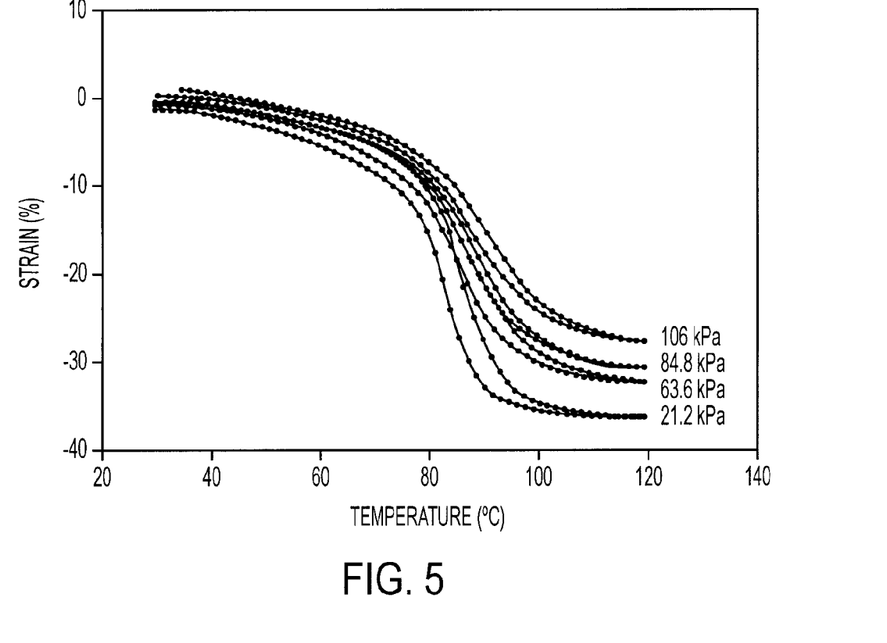
FIG. 5 is a graph of strain vs. temperature for the fiber under different stresses.

Thermoelastic studies performed on both heating and cooling cycles at 0.5° C./min rate are shown in FIG. 5 for four values of applied stress. The strain was measured as a function of temperature at constant applied stress over a temperature range covering the nematic-to-isotropic phase transition. The length of the fiber remained constant well in the nematic phase and started to slowly decrease as the isotropic phase was approached.

At the nematic-to-isotropic phase transition, a sharp decrease in length of ~30-35% was observed followed by a slow decrease into the isotropic phase (FIG. 5). On cooling the process was reversed with a sharp increase in length on going from the isotropic-to-nematic phase. After each heating/cooling cycle, the temperature was equilibrated for 3 min before increasing the stress value, and the next cycle was performed after an isothermal hold for another 3 min. The upward shift of the curves with increasing applied stress was due to the increase in length on stretching. An increase was observed in the temperature at which the maximum contraction/extension occurred, which is predicted by the phenomenological Landau model for a homogeneous elastomer under an aligning stress. The smooth variation of the induced strain was a result of a similar variation in the order parameter.

Isostrain measurement was carried out on the fiber by maintaining a constant strain on the material and measuring the force generated as a function of temperature. The retractive force developed in the fiber as it was heated through the nematic-to-isotropic phase transition was measured by holding the fiber at constant length with a known strain imposed on it. As the orientational order was decreased with increasing temperature, the conformational constraint on the polymer network was relaxed, and its effect on an unconstrained elastomer would be to change its shape. However, in this experiment, since the length of the elastomer was held constant, a retractive force developed as the temperature was increased. The maximum retractive force measured in the isotropic phase at a constant strain of 3% was 274 kPa.

EXAMPLE 4

Figure 7:
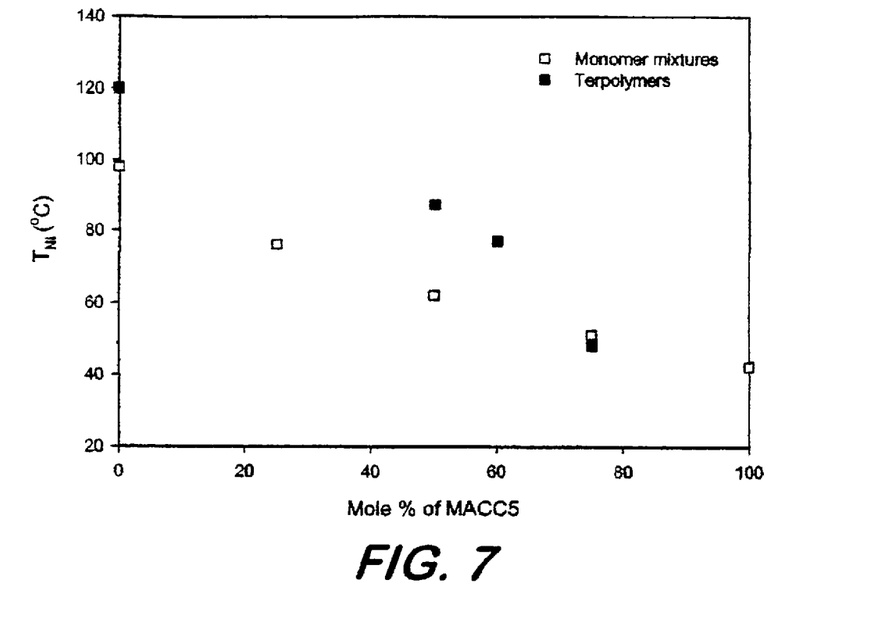
FIG. 7 shows a plot of the nematic-to-isotropic transition temperatures of a series of mixtures of the two mesogens with different compositions.

Phase Behavior—FIG. 7 shows a plot of the nematic-to-isotropic transition temperatures of a series of mixtures of the two mesogens with different compositions, as measured by DSC. The figure also shows the transition temperatures of the terpolymers prepared from the two monomers and the hydroxyl pendent group. The concentration of the nonmesogenic hydroxyl group was kept constant at 10 mol % for all of terpolymers. A 40/60 mol % of MACC4/MACC5 in the terpolymer had reasonably low N-1 and glass transition temperatures combined with the ability of drawing smooth fibers from this sample. Phase transition behavior of the monomers, terpolymer, and fibers was characterized by DSC. The phase transition temperatures on cooling are given in Table 1 along with the chemical composition of the polymers.

TABLE 1

| material | $T_g$ (° C.) | $T_{IN}$ (° C.) | MAOC4 (mol %) | MACC5 (mol %) |
|---|---|---|---|---|
| MAOC4 | 71.9 ($T_{KN}$) | 98.3 | | |
| MACC5 | 74.0 ($T_{KI}$) | 42.2 | | |
| terpolymer | 28 | 77 | 40 | 60 |
| fiber (10% crosslinker) | 33 | 79.6 | 40 | 60 |

Figure 4A:
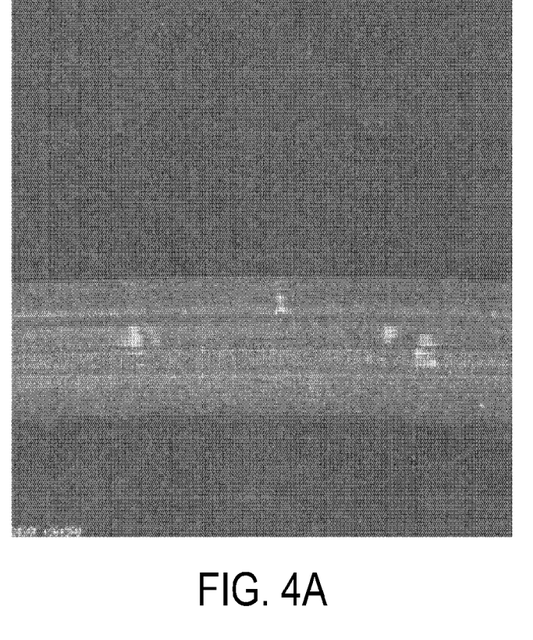
FIG. 4 is a micrograph of the fiber.
Figure 4B:
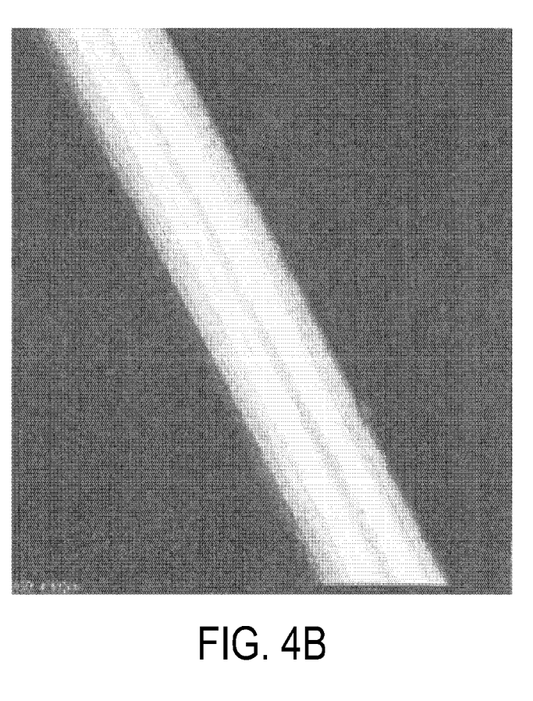

The isotropic-to-nematic transition of MACC5 was monotropic. The terpolymer and the elastomer exhibited an enantiopropic phase transition between the nematic and isotropic phases. The polymerization and cross-linking processes stabilized the nematic phase. The liquid crystal elastomer fiber displayed textures in the optical microscope, which correspond to a nematic phase with a good alignment of the molecular director along the fiber axis (FIG. 4). The figure shows a LC fiber placed between cross-polarizers at room temperature. The uniform birefringence observed upon rotating the sample to a 45° position with respect to the analyzer shows that the molecules are well oriented along the fiber axis in the sample. On the basis of the earlier neutron scattering on similar LC side-chain polymers, one can expect conformational constraints on the backbone and a concomitant anisotropy in the polymer chain and therefore a contraction along the fiber axis.

Theoretical studies by Warner et al. have suggested how this coupling might affect the phase behavior of LC elastomers. Cross-linking the polymer, which introduces network points that are chemically immobile, can enhance this coupling. As a result, although there is some flexibility in the chain between network points, the introduction of such fixed points imposes additional stability on those conformations present at the time of cross-linking.

Figure 6:
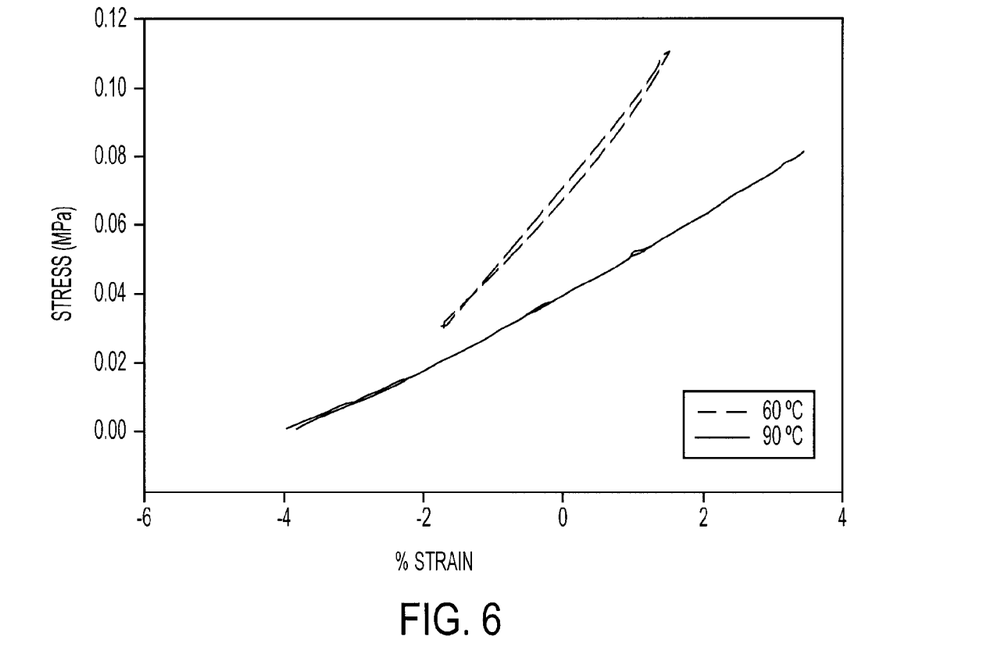
FIG. 6 is a graph of stress vs. strain for the fiber.

If an elastomer has to be used as an actuator to generate work, the material has to overcome viscoelastic losses. Large energy losses can seriously affect the performance of the material or can even make them unusable. The viscoelastic losses can be determined by performing cyclic scans of force vs. strain. These scans generate passive work loops that move clockwise, and the area enclosed by the loops is a measure of the viscoelastic losses. FIG. 6 shows the work loops performed on the elastomer by varying the force on the fiber at 0.001 N/min in the nematic and isotropic phases. Multiple cycles were performed, showing no increase in the area of the loop. The work loops moved in a clockwise direction, which indicates that the work was absorbed rather than produced over a cycle. The amount of energy absorbed, which represents the viscoelastic losses in the elastomer, is represented by the area within the loop. This was calculated to be 0.085 J/kg at 60° C. At 90° C., the loss was even smaller and not measurable. In comparison, VHB 4910 acrylic and CF19-2186 silicone elastomers show a viscoelastic loss of 13.17 and 3.19 J/kg, respectively, values which are much larger than that measured in the present material. This indicates that the material exhibits a spring-like behavior with negligible losses during the passive work loop.

To demonstrate that the fiber is capable of producing useful work, the fiber was mounted inside a heating coil. The upper end of the fiber (12.6 mm long and 0.3 mm in diameter) was fixed, and a 200 mg load was attached to the lower end. The fiber was heated by passing current through the Nichrome coil. When the temperature was increased above the nematic-isotropic transition temperature, the fiber contracted and was able to lift the weight. The induced strain was 40% of the original length.

For a biological muscle, the maximum work output ranges from 0.18 to 40.57 J/kg. Meijer et al., *Proc. SPIE, Smart Struct. and Mat.*, 7, 4329 (2001) established a protocol to measure the functional workspace of electroactive polymer actuators using the same setup and techniques that were used to test biological muscles. The resulting stress-strain plot will generate a counter-clockwise workloop, the amount of work generated being represented by the area within the loop. This general protocol was used to develop and active workloop for the fibers using to isotonic cycles during which the temperature was stepped up or down at a fast rate while keeping the force on the muscle constant. These two isotonics were interspersed with two isothermal cycles in which the force was varied at a constant rate while holding the temperature either in the nematic or isotropic phase. The workloops thus obtained generated work similar to skeletal muscles with outputs ranging from 4.8-23 J/kg.

EXAMPLE 5

Carbon nanotube doped fiber—Single-wall carbon nanotubes were purchased from Carbon Nanotechnologies, Inc. (Houston, Tex.). A solution of nanotubes (5 mg) in dichloromethane, terpolymer (30 mg), and MDI (0.62 mg) was stirred for 2 hr at room temperature. The solvent was evaporated under vacuum, and the fiber was drawn from a melt at 60° C. as described above.

The actuation in the liquid crystal elastomer described here is induced by a temperature change. The strain rate of these types of thermostrictive materials is mostly dictated by the thermal conductivity of the material. It has been shown that carbon coating of LCE is an effective approach to enhance the response of an elastomer film to an external stimulus. The fast conduction of the heat generated in the carbon coating by absorption of infrared laser radiation through the film leads to a significant reduction in the actuation time.

Figure 9:
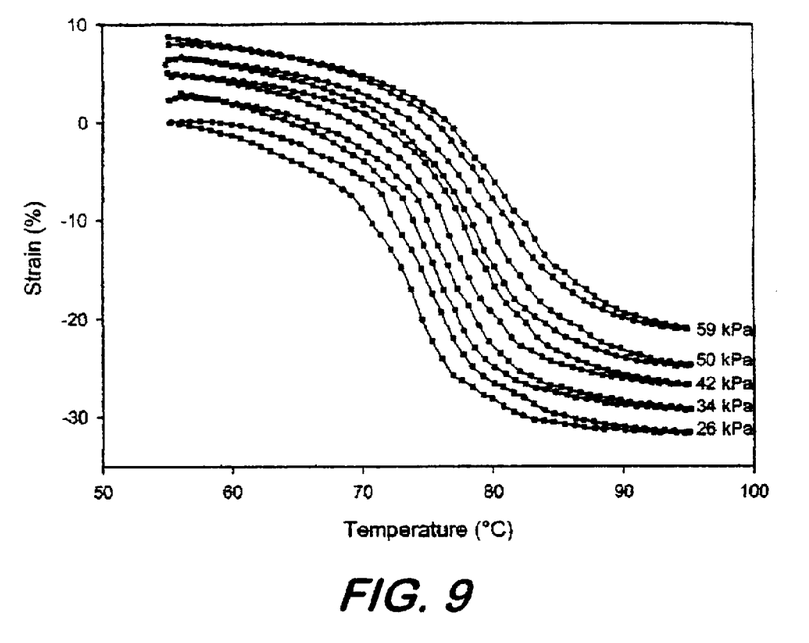
FIG. 9 shows a stress vs. strain plot of the fiber doped with carbon nanotubes.
Figure 10:
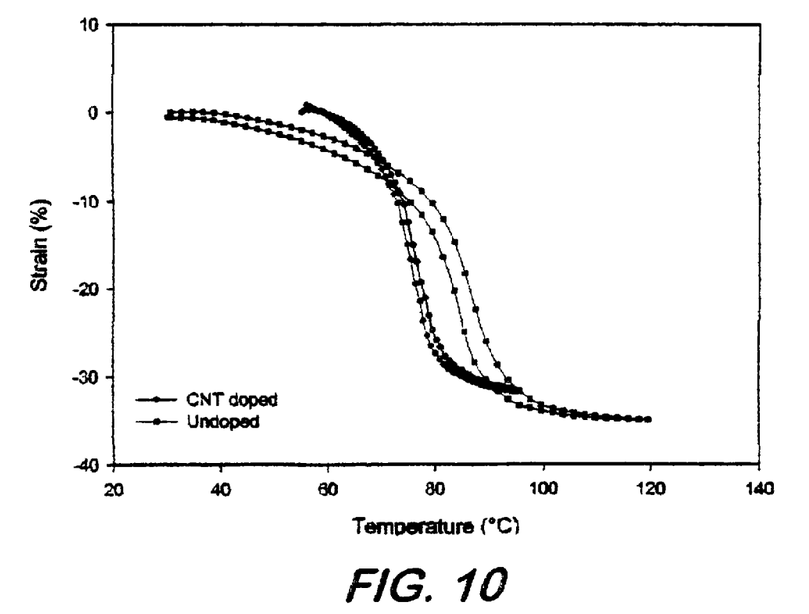
FIG. 10 shows a comparison of strain variation between doped and undoped fibers.

The fibers were doped with carbon nanotubes without affecting the mechanical properties of the liquid crystal elastomer. Thermoelastic studies performed on fiber doped with nanotubes in both heating and cooling cycles at 0.5° C. rate are shown in FIG. 9 for five applied stress values. The results were qualitatively similar to that of undoped fiber with a large strain observed at the nematic-isotropic phase transition. FIG. 10 is a comparative plot of the two fibers at 34 kPa, showing that the doping did not adversely affect the strain value. In fact, there were two positive effects of doping: decrease in transition temperature and sharpening of the transition with a smaller hysteresis.

Obviously, many modifications and variations of the present invention are possible in light of the above teachings. It is therefore to be understood that the claimed invention may be practiced otherwise than as specifically described.

What is claimed is:

1. A fiber comprising:
    a polymeric backbone comprising a liquid crystalline side group and a crosslinking side group, both bonded to the backbone; and
    crosslinks between the crosslinking side groups;
    wherein the liquid crystalline side group is laterally affixed to the backbone.

2. The fiber of claim 1, wherein the backbone is selected from the group consisting of polyacrylic, polysiloxane, and polynorbornene.

3. The fiber of claim 1, wherein the liquid crystalline side group comprises the formula:

$$T^1\text{-}A^1\text{-}X\text{-}A^2\text{-}X\text{-}A^1\text{-}T^2$$

wherein $T^1$ is selected from the group consisting of alkyl, polysiloxyl, and alkylpolysiloxyl;
wherein $T^2$ is selected from the group consisting of alkyl, alkenyl, polysiloxyl, alkylpolysiloxyl, and cyano;
wherein each X is independently selected from ester group, azo, azoxy, and covalent bond;
wherein each $A^1$ is independently selected from the group consisting of phenyl, oxyphenyl, substituted phenyl, substituted oxyphenyl, and cyclohexyl;
wherein $A^2$ is selected from the group consisting of phenyl and substituted phenyl;
wherein one of $A^1$ and $A^2$ is substituted with wherein R is selected from the group consisting of —CH$_2$—CH$_2$—* and —*;
wherein n is a nonnegative integer; and
wherein * represents the backbone.

4. The fiber of claim 3, wherein $T^1$ and $T^2$ are independently selected from the group consisting of linear alkyl, n-butyl, n-pentyl, ethylcyclopropyl, and wherein m and p are independently selected nonnegative integers.

5. The fiber of claim 3, wherein n is from 4 to 12.

6. The fiber of claim 3, wherein the backbone is polyacrylic and R is —*.

7. The fiber of claim 3, wherein the backbone is polysiloxane and R is —CH$_2$—CH$_2$—*.

8. The fiber of claim 1, wherein the crosslinking side group is 1,4-n-butyl or 1,5-n-pentyl; or comprises an alkyl group.

9. The fiber of claim 1, wherein the crosslink:

is or ethoxy;

comprises carbamide groups; or
comprises a crosslinking site formed from acrylic, photopolymerizable group, epoxy, or diacrylate.

10. The fiber of claim 1, wherein the orientation of the liquid crystalline side groups and the backbones changes in response to a stimulus selected from the group consisting of thermal, electrical, and photo.

11. The fiber of claim 10, wherein the dimensions of the fiber change in response to the stimulus.

12. An artificial muscle comprising the fiber of claim 1.

* * * * *